Oct. 23, 1962 W. F. FISCHER ET AL 3,059,682
ADHESION OF DISSIMILAR POLYMERS
Filed March 30, 1956
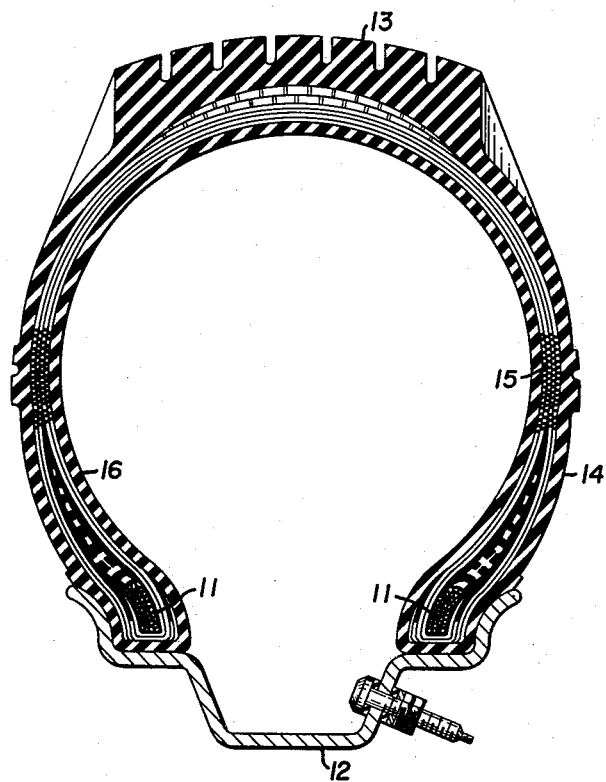
Wilbur F. Fischer
John L. Ernst
Inventors
By *W. H. Smyers*  Attorney

United States Patent Office 3,059,682
Patented Oct. 23, 1962

3,059,682
ADHESION OF DISSIMILAR POLYMERS
Wilbur F. Fischer, Cranford, and John L. Ernst, Westfield, N.J., assignors to Esso Research and Engineering Company, a corporation of Delaware
Filed Mar. 30, 1956, Ser. No. 575,203
9 Claims. (Cl. 152—354)

This invention relates to novel bonding methods for forming strong adherent bonds between dissimilar rubbery polymer compounds; to chlorinated butyl rubber-containing cement compositions especially adapted for use as bonding means for said dissimilar polymer compounds; and to the resulting structures composed of a plurality of different types of rubbery polymers.

In a variety of operations to produce rubbery and/or elastic type structures, it is frequently desirable to make one portion of the article from one kind of rubbery material, and the other portion from some other kind of rubbery substances. As an example of the foregoing type of bonding between dissimilar rubbery materials, in the production of pneumatic tires containing more than one polymer type, it is necessary to form an adequate and firm bond between inner linings, treads or sidewalls prepared from relatively low unsaturation isoolefin-multiolefin copolymers such as butyl rubber and the more highly unsaturated rubbery materials such as diene-styrene copolymers, natural rubber, and other highly unsaturated rubbery polymers and mixtures of such rubbery materials from which the carcass is ordinarily prepared.

However, natural rubber, GR–S rubber, Buna–N rubber, and other highly unsaturated rubbers differ greatly from low unsaturation isoolefin-multiolefin copolymers such as butyl rubber in their chemical and physical properties as well as in their respective reactions to compounding, filling, and vulcanizing agents. It is virtually impossible to combine these dissimilar rubbery materials securely by conventional methods used in laminating rubber-like materials of similar properties.

The present invention overcomes the foregoing difficulty and affords various additional advantages as shown in the following description wherein reference will be made to the accompanying drawing, the single FIGURE of which comprises a vertical section of a laminated pneumatic tubeless tire containing dissimilar rubber laminae which have been bonded according to the instant invention.

According to the present invention, low unsaturation isoolefin-multiolefin rubbery copolymers are bonded to highly unsaturated rubbers by the application of at least two adjacent layers of different cements containing chlorinated butyl rubber to the combining surfaces. A chlorinated butyl rubber cement, without additional rubbery polymers, is applied to the uncured low saturation isoolefin-multiolefin copolymer surface. An admixture of chlorinated butyl rubber with at least one other more highly unsaturated rubber such as GR–S rubber, natural rubber, mixtures thereof, etc. is applied to the highly unsaturated, uncured copolymer surface also as a cement. The respective unvulcanized rubbery polymer surfaces so treated are then placed together face to face, compressed, and cured at temperatures between about 250° and 450° F. to produce the desired high-strength union, junction or weld therebetween.

In practicing the present invention, each of the respective chlorinated butyl rubber-containing cements is preferably prepared by mixing per 100 parts by weight of total chlorinated and other polymer or polymers, about 0 to 100, preferably 20 to 60 parts by weight of a filler such as clays, silica, silica-alumina, in particular carbon blacks, and blending the mixture formed with a suitable volatile rubber solvent to a concentration of about 2 to 50, preferably 5 to 20 weight percent based on total rubber hydrocarbon. Suitable rubber solvents include paraffins such as hexane, heptane, isooctane, naphthenes such as cyclohexane, aromatics such as benzene, toluene, or naphthalene, various petroleum hydrocarbon fractions such as naphthas, gasolines, kerosenes, straight run mineral spirits, halogenated hydrocarbons such as ethyl chloride, chloroform, carbon tetrachloride, and other volatile solvents such as phenol, carbon disulfide, etc. The cements are then coated on the respective uncured polymers by brushing, spraying, etc. and the solvent allowed to substantially completely evaporate at temperatures between about 10° to 100° C., preferably about 25 to 80° C.

As abovementioned, the cement to be applied to the low unsaturation isoolefin-multiolefin rubbery copolymer preferably comprises chlorinated butyl rubber without other rubbery polymers or copolymers. However, the cement to be applied to the more highly unsaturated rubbers such as natural rubber, GR–S rubber, mixtures thereof, etc. should comprise about 25 to 75 weight percent, advantageously about 40 to 60 weight percent, preferably about 50 weight percent of a highly unsaturated rubber, especially natural rubber, with about 75 to 25 weight percent, advantageously about 60 to 40 weight percent, preferably about 50 weight percent of chlorinated butyl rubber. More particularly, the cement to be applied to the low unsaturation isoolefin-multiolefin rubbery copolymer preferably comprises a 5 to 25 weight percent solution in a $C_5$ to $C_{10}$ relatively saturated hydrocarbon liquid solvent such as pentane, hexane, isooctane, cyclohexane, benezene, toluene, naphtha, straight run mineral spirits, etc. of an admixture of about 100 parts by weight of chlorinated butyl rubber, about 10 to 70 parts by weight of a filler such as a hydrated silica and/or carbon black, 0–20 parts by weight of a resin tackifier such as phenolic-aldehyde resins, without other rubbery polymers or copolymers. However, the cement to be applied to the more highly unsaturated rubber should comprise a 5 to 20 weight percent solution in the foregoing hydrocarbon solvents of about 100 parts by weight of an approximately equal mixture of natural rubber and chlorinated butyl rubber blended with the foregoing amounts of fillers and resin tackifiers.

It has also been found advantageous that the respective cements applied contain descreased amounts of curatives and preferably no curatives. Such curatives, if used, may include sulfur, zinc oxide, an ultra-accelerator such as a thiuram or carbamic acid derivative, quinoid compounds, amino or amido compounds, etc. In producing the desired bond, the cemented sides of the two dissimilar rubbery polymers are united, compressed at 300 to 2000 p.s.i.g., e.g. 1,500 p.s.i.g. by any suitable means such as in a rubber press and simultaneously vulcanized at temperatures of about 275° to 400° F., preferably 290° to 350° F. for a few minutes up to several hours or more, e.g. 10 to 60 minutes.

The above procedure, according to the present invention, may be employed to produce superior laminated materials suitable for use in constructing tires for automobiles, trucks, airplanes, etc. as well as for numerous other uses such as conveyor belts and other products built up of a plurality of laminations of dissimilar rubbers; the invention being especially applicable to such products which have at least one layer which is made of butyl rubber.

Butyl rubber comprises a copolymer containing a major proportion, advantageously about 85–99.9%, preferably 95–99.5%, of a $C_4$–$C_8$ isoolefin such as isobutylene, the remainder being a $C_4$–$C_{10}$ multiolefin, preferably a $C_4$–$C_6$ conjugated diolefin, such as butadiene, dimethyl butadiene, piperylene, allo-ocymene, or especially isoprene. The preparation of butyl-type rubbers is described in U.S. Patent 2,356,128 to Thomas et al. and also in other patents as well as in literature.

The chlorinated butyl rubber component of the cement employed according to the present invention contains at least 0.5, preferably at least 1.0 weight percent combined chlorine but not more than about 2 "X" weight percent and preferably not more than about "X" weight percent combined chlorine wherein $$X = \frac{35.46L}{(100-L)M_1 + L(M_2+35.46)} \times 100$$

and:

$L$ = mole percent of the multiolefin in the polymer
$M_1$ = molecular weight of the isoolefin
$M_2$ = molecular weight of the multiolefin
35.46 = atomic weight of chlorine The above chlorinated butyl rubber is produced by reacting the unvulcanized butyl rubber with chlorine or chlorine-containing compounds so that the polymer contains at least 0.5 weight percent of combined chlorine but not more than about 1 atom of chlorine combined in the polymer per molecule of multiolefin present therein; i.e. not more than about one atom of combined chlorine per double bond in the polymer.

Suitable chlorinating agents which may be employed are molecular chlorine, alkali metal hypochlorites (preferably sodium hypochlorite), sulfur chlorides (particularly oxygenated sulfur chlorides), pyridinium chloride perchloride, N-chlorosuccinimide, alpha-chloroaceto acetanilide, tri-chlorophenol chloride, N-chloroacetamide, beta-chloro-methyl phthalimide, and other common chlorinating agents. The preferred chlorinating agents are molecular chlorine and even more especially sulfuryl chloride. The chlorination is advantageously conducted at 0° to 100° C. and preferably at about 20° to 80° C. for about one minute to several hours. However, the temperatures and times are regulated to chlorinate the rubbery copolymer to the desired extent within the limits abovementioned.

The chlorination may be accomplished in various ways. One process comprises preparing a solution of the rubbery butyl copolymer in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, naphthalene, chlorobenzene, chloroform, trichloroethane, carbon tetrachloride, etc., and adding thereto the chlorine or other chlorinating agent, preferably in solution, such as dissolved in an alkyl chloride, carbon tetrachloride, etc. Other variations, which are not as preferred, comprise employing the chlorinating agent in the form of a gas, and contacting the gas with either a solution of the butyl copolymer or the solid copolymer per se. For example, if elemental chlorine is employed, it is most advantageously added in an alkyl chloride or carbon tetrachloride solution rather than in the gaseous state. The use of elevated or depressed pressures is optional since atmospheric pressure is satisfactory although the pressure may vary, depending upon the foregoing temperatures and times from about 1 to 400 p.s.i.

The copolymer to be chlorinated is advantageously first dissolved in a solvent such as any of the foregoing, especially a saturated hydrocarbon or a completely chlorinated hydrocarbon. Particularly preferred solvents for specific chlorinating agents are as follows: carbon tetrachloride and/or chloroform for molecular chlorine, paraffinic hydrocarbons and/or carbon tetrachloride and/or aromatics such as benzene as non-polar solvents for chlorination with certain chlorinating agents, especially sulfuryl chloride. However, any of the above-listed chlorinating agents may be employed with an inert polar solvent for the rubbery copolymers providing the conditions of chlorination and amounts of the chlorinating agent are carefully controlled.

As hereinbeforementioned, the cement for coating the highly unsaturated rubbers includes not only chlorinated butyl rubber but also at least one other more highly unsaturated rubber such as natural rubber and/or GR-S rubber, etc. The production of natural rubber is well known in the art. The production of GR-S rubber is likewise widely known, said rubber being a copolymer of 60 to 80 parts by weight of butadiene and 20 to 40 parts by weight of styrene, GR-S is preferably obtained by polymerizing 75 parts of butadiene and 25 parts of styrene in aqueous emulsion. Polymerization is initiated by bringing the monomer mixture to a temperature between about −40° C. and about +100° C., preferably between about −40° C. to about +50° C., in the presence of a substance capable of accelerating the reaction such as a peroxide or persulfate with or without added solvents. When polymerization is complete the rubbery solid polymer is separated from liquids such as unreacted monomers and/or solvent and water generally by coagulating the polymer, decanting the liquids, water-washing, and drying the final product. The preparation of GR-S rubber is described in U.S. Patent 2,385,172 to which reference may be had for further details.

The above general process for producing GR-S rubber may likewise be generally employed for producing other highly unsaturated rubbers such as Buna-N rubber, which is a copolymer of butadiene and acrylonitrile and other rubbery polymers as hereinafter indicated. It may also be applied, for example, to polymers obtained by polymerization in aqueous emulsion of conjugated diolefins, such as butadiene, isoprene, piperylene, dimethyl butadiene, 2-chlorobutadiene-1,3, taken singly or in combination, or to emulsion copolymerizates obtained by polymerizing such diolefins in combination with unsaturated co-monomers, i.e., copolymerizable compounds containing a single terminal methylene group such as styrene (supra), and also homologues of styrene, such as alpha methyl styrene, para methyl styrene, alpha methyl para methyl styrene, nitriles of low molecular weight unsaturated acids such as acrylonitrile (supra), methacrylonitrile, chloroacrylonitrile, methyl acrylate, methyl methacrylate and ketones such as methyl vinyl ketone or mixtures thereof.

Other highly unsaturated synthetic rubbers are polymers of substituted butadienes-1,3 which include butadiene-1,3 or its homologues such as isoprene and 2,3-dimethyl butadiene, where the substituents are either chlorine or cyano groups, or the synthetic rubbers may be rubbery copolymers of various of the butadienes-1,3 with other ethylenic monomers, and in this case either the butadienes or the ethylenic monomer or both the butadienes and the ethylenic monomer may contain substituents of chlorine or cyano groups. The copolymer generally contains at least 50% by weight of one of the butadienes-1,3. Such compounds useful in the present invention include polymers of 3-chloro butadiene-1,3; 3-bromo butadiene-1,3; 3-cyano butadiene-1,3; chloro isoprene; bromo isoprene; and cyano isoprene. They also include polymers of butadiene-1,3 with vinylidene chloride, p-chloro styrene, or methyl alpha chloro acrylate; copolymers of 3-chloro butadiene-1,2 with the above and/or with acrylonitrile, methacrylonitrile, etc.; copolymers of 3-cyano butadiene-1,3 with the above; copolymers of 2,3-dimethyl butadiene with either 3-chloro butadiene-1,3 or 3-cyano butadiene-1,3 etc. Those compounds which are copolymerized with the butadienes are preferably ethylenic monomers and it is preferred that they contain a $CH_2=C<$ group.

The invention will be better understood from the following experimental data:

*Chlorinated Butyl Rubber—"A"*

Sixty grams of butyl rubber (GR-I-15) were dissolved in 960 grams of carbon tetrachloride. This solution was then saturated with sulfur dioxide (which is an optional step). Eighteen milliliters of liquid sulfuryl chloride were then added and reaction was allowed to ensue for one hour at room temperature. The chlorinated rubbery polymer formed was then precipitated by the addition of excess isopropyl alcohol. In place of isopropyl alcohol, other known non-solvents for butyl rubber may be employed such as $C_1$-$C_4$ alkanols, ketones such as acetone, etc. The rubbery polymer was then redissolved in hexane and reprecipitated with isopropyl alcohol. The chlorinated rubbery product was dried at 65° C. under a vacuum of 0.1–2.0 inches of mercury absolute. The chlorinated product compared to the original polymer as follows:

| Original Polymer[1] | Chlorinated Product[1] |
|---|---|
| Iodine No. (cg./g.) =11.6 | Iodine No. (cg./g.) =4.87<br>0.8 wt. percent combined chlorine. |

*Chlorinated Butyl Rubber—"B"*

Thirty grams of butyl rubber (GR–I–15) were dissolved in 300 cc. of carbon tetrachloride. Fifteen milliliters of liquid sulfuryl chloride were then added and reaction was allowed to ensue for one hour at room temperature. Recovery of the polymer was by multiple precipitation with isopropanol as described for chlorinated butyl rubber "A." The chlorinated rubbery product was then dried at 65° C. under a vacuum of 0.1–2.0 inches of mercury absolute.

*Chlorinated Butyl Rubber—"C"*

The same general procedure as in the preparation of chlorinated butyl rubber—"B" was repeated except that the unchlorinated butyl rubber was GR–I–25.

*Chlorinated Butyl Rubber—"D"*

The same general procedure as in the preparation of chlorinated butyl rubber—"B" was repeated except that the GR–I–15 was dissolved in 300 cc. of n-heptane instead of carbon tetrachloride.

EXAMPLE

A cement was prepared by mixing 100 parts by weight of chlorinated butyl rubber "A" with 40 parts by weight of carbon black (M.P.C. black) and dissolving in n-hexane to a concentration of 10 weight percent based on total rubber hydrocarbon. A coating of the foregoing cement was then brushed on two samples of an uncured butyl rubber compounded stock measuring 2 inches by 6 inches by 0.125 inch and dried at room temperature for one hour. The composition of the butyl rubber stock was as follows:

| Component | Parts by Weight | |
|---|---|---|
| | Employed | Preferred Range |
| Commercial Butyl Rubber (corresponding to a GR–I–25 rubber) | 100 | 50–200 |
| Carbon Black (M.P.C.) | 66.0 | 20–100 |
| Zinc oxide | 5.0 | 3–50 |
| Sulfur | 2.0 | 0.5–20 |
| Stearic Acid | 0.5 | 0–5.0 |
| Tellurium Diethyl Dithiocarbamate | 1.25 | 0.3–10.0 |
| Hydrocarbon Plasticizer Oil [1] | 12.5 | 0–75 |

[1] The hydrocarbon plasticizer oil employed was an aromatic petroleum hydrocarbon oil derived from a naphthenic crude having the following characteristics:

| | Employed | Preferred Range |
|---|---|---|
| Specific Gravity | 0.96 | 0.90–0.99 |
| Flash Pt. (° F., open cup method) | 520 | 450–600 |
| Aniline Point, ° F | 177 | 150–200 |
| SSU at 100° F | 11,626 | 5,000–15,000 |
| SSU at 210° F | 252 | 100–500 |
| $I_2$ No. (cg./g.) | 49 | 25–75 |

Two other cements were prepared as just described except that they contained 50 and 60 parts by weight of natural rubber, the balance of the rubber hydrocarbon content being 50 and 40 parts by weight of chlorinated butyl rubber "A," respectively. These cements were then each coated on a commercial uncured GR–S–natural rubber carcass stock, the cement concentration applied, coating technique and drying conditions being otherwise the same as above described.

The cement-coated surfaces of the two butyl rubbers on the one hand were then united with the cement-coated surfaces of the carcass stocks on the other hand and press-cured for 35 minutes at a temperature of 307° F. under 1,500 p.s.i. pressure in a rubber mold. The results were as follows:

| Test # | Cement on Butyl (Chlorinated Butyl, percent) | Cement on GR–S–Natural Rubber Commercial Carcass | | Pound Pull per inch |
|---|---|---|---|---|
| | | (Chlorinated Butyl, percent) | (Natural Rubber, percent) | |
| 1 | 100 | 50 | 50 | 58 |
| 2 | 100 | 40 | 60 | 48 |

The above data show that improved adhesions of 48 to 58 pounds pull per inch are obtained according to the invention when coating the uncured butyl rubber with a chlorinated butyl rubber cement and the more highly unsaturated commercial GR–S–natural rubber carcass with a cement comprising an admixture of 40 to 50 weight percent chlorinated butyl rubber and 50 to 60% natural rubber. Heretofore, butyl rubber cements not containing chlorinated butyl rubber have resulted in from 0 to 5 pounds pull per inch. Also, by employing only the chlorinated butyl rubber cement without an additional cement containing both chlorinated butyl and natural rubber, adhesion values of only 1 to 10 pounds per inch have been obtained.

One particular advantageous use for the chlorinated butyl rubber cement combinations of the present invention is in penumatic tires of either the inner tube containing variety or in a tubeless type tire. Referring now to the drawing, the single figure depicts a pneumatic tubeless tire, mounted on wheel rim 12, which comprises a hollow toroidal type member which is substantially U-shaped in cross-section by virtue of an open portion which extends around the inner periphery of the member. In other words, the tire is of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs to aid in adhesion to rim 12 when the tire is inflated.

The outer layer of the tire includes tread area 13 and sidewalls 14. The open portion of the horseshoe-shaped tire faces that portion of the inner circumference of the tire which is adjacent the said tread area 13 of the tire. The remaining construction of the tire may vary according to conventional fabrication, but in general the tire is a multi-layered type of structure with an outer layer as abovementioned. The layer next adjacent the outer layer generally comprises a carcass 15 which includes a rubber having incorporated therein a fabric composed of a plurality of cotton, rayon, or nylon cords.

The tire also includes an inner lining 16 advantageously made from rubber, e.g. butyl rubber or chlorinated butyl rubber, which must be substantially impermeable to air. For example, the lining 16 may advantageously comprise a rubbery copolymer, chlorinated copolymer or mixtures of the above wherein the copolymer comprises the reaction product of about 70 to 99.5 weight percent of a $C_4$–$C_7$ isoolefin, such as isobutylene, and about 0.5–30 weight percent of a $C_4$–$C_{14}$ multiolefin, such as isoprene which has been at least partially vulcanized by heating in the presence of a vulcanization agent for several minutes to 5 hours at 200°–400° F. The above multi-layers, at least three in number, are conventionally bonded or otherwise adhered together, for example, by cementing and/or especially by vulcanization, etc., to form a tire of a unitary structure.

If the carcass 15 is of GR–S rubber or GR–S and natural rubber, the chlorinated butyl rubber cement combinations of the present invention are advantageously employed between said carcass 15 and inner lining 16 if said lining is of butyl rubber. The chlorinated butyl rubber cement combinations of the present invention are also advantageously interposed between carcass 15 and the outer layer comprising tread area 13 and sidewalls 14 if said outer layer is of butyl rubber, e.g. high molecular weight-oil extended butyl rubber. In either or both instances, i.e., where the butyl rubber is employed as an air-holding inner lining or as an abrasion resistant, tread and sidewall area; the resulting tires are of increased commercial value.

Resort may be had to various modifications and variations without departing from the spirit of the invention or the scope of the appended claims.

What is claimed is:

1. In a rubber tire, the combination which comprises a carcass member containing a plurality of cords embedded in an unsaturated rubber, and at least one layer of isoolefin-multiolefin butyl rubber polymer adhesively united thereto by means of two interposed cements, the first cement being adjacent the butyl rubber and comprising a vulcanizable substitution chlorinated isoolefin-multiolefin butyl rubber, said first cement being free of other vulcanizable rubbery materials, the second cement being adjacent the highly unsaturated rubber and comprising an admixture of said chlorinated butyl rubber and natural rubber.

2. In a process for manufacturing a tubeless tire including a carcass member containing a composition comprising a rubbery copolymer of butadiene and styrene, the combination which comprises at least partially vulcanizing to said carcass member a layer disposed interiorly thereof, which layer comprises a rubbery copolymer of a major proportion of an isoolefin and a minor proportion of a multiolefin reactive therewith, and vulcanizing to said carcass member a layer disposed exteriorly thereof comprising a rubbery copolymer containing about 85 to 99.5 weight percent of a $C_4$–$C_8$ isoolefin and a minor proportion of a $C_4$–$C_{10}$ multiolefin, said rubbery copolymer containing layers having been adhesively united to the carcass by pre-coating them with a cement containing a vulcanizable substitution chlorinated isoolefin-multiolefin butyl rubber, said cement being free of other vulcanizable rubbery materials, pre-coating the carcass with a cement containing an admixture of both a chlorinated isoolefin-multiolefin butyl copolymer with natural rubber, and curing the resulting structure formed.

3. A process for preparing a laminar elastic structure which comprises providing a bottom layer comprising an unvulcanized isoolefin-multiolefin butyl rubber; providing a top layer comprising an unvulcanized highly unsaturated rubber coating selected from the group consisting of the copolymer of butadiene with styrene, the copolymer of butadiene with acrylonitrile, and natural rubber; coating said bottom layer with a first cement comprising a single unvulcanized rubbery polymer of an isoolefin with a multiolefin which has been halogenated to incorporate by a substitutional reaction more than 0.5 wt. percent of combined halogen in its structure; coating said top layer with a second cement comprising 25 to 75% of a highly unsaturated unvulcanized rubbery polymer in admixture with 75 to 25% of an isoolefin-multiolefin polymer which has been halogenated to incorporate by a substitutional reaction more than 0.5 wt. percent of combined halogen in its structure; drying said coated bottom layer and said coated top layer at elevated temperatures; placing said dried top layer and said dried bottom layer together with said first coating adjacent to said second coating; compressing and cocuring said layers with said adjacent coatings to provide a unitary vulcanizate therefrom with improved adhesion.

4. Process according to claim 3 in which the curing is at a temperature level between about 250° to 450° F.

5. An article of manufacture which has been prepared by providing a bottom layer comprising an unvulcanized isoolefin-multiolefin butyl rubber; providing a top layer comprising an unvulcanized highly unsaturated rubber coating selected from the group consisting of the copolymer of butadiene with styrene, the copolymer of butadiene with acrylonitrile, and natural rubber; coating said bottom layer with a first cement comprising a single unvulcanized rubbery polymer of an isoolefin with a multiolefin polymer which has been halogenated to incorporate by a substitutional reaction more than 0.5 wt. percent of combined halogen in its structure; coating said top layer with a second cement comprising 25 to 75% of a highly unsaturated unvulcanized rubbery polymer in admixture with 75 to 25% of an isoolefin-multiolefin polymer which has been halogenated to incorporate by a substitutional reaction more than 0.5 wt. percent of combined halogen in its structure; drying said coated bottom layer and said coated top layer at elevated temperatures; placing said dried top layer and said dried bottom layer together with said first coating adjacent to said second coating; compressing and cocuring said layers with said adjacent coatings thereon to provide a unitary vulcanizate therefrom with improved adhesion.

6. A composition of matter which comprises a bottom layer comprising an unvulcanized isoolefin-multiolefin butyl rubber; a top layer comprising an unvulcanized highly unsaturated rubber selected from the group consisting of the copolymer of butadiene with styrene, the copolymer of butadiene with acrylonitrile, and natural rubber; said bottom layer having a first cement layer thereon comprising a single unvulcanized rubbery polymer of an isoolefin with a multiolefin which has been halogenated to incorporate by a substitutional reaction more than 0.5 wt. percent of combined halogen in its structure; said top layer having a second cement layer thereon comprising 25 to 75% of a highly unsaturated unvulcanized rubbery polymer in admixture with 75 to 25% of an isoolefin-multiolefin polymer which has been halogenated to incorporate by a substitutional reaction more than 0.5 wt. percent of combined halogen in its structure; said first cement layer being adjacent to said second cement layer; said composition being adapted for cocuring to provide a unitary structure therefrom with improved adhesion.

7. The composition according to claim 6 in which the top layer comprises natural rubber.

8. The composition according to claim 6 in which the top layer comprises a rubbery copolymer of butadiene with styrene.

9. In a tubeless tire, the combination which comprises an inner layer of a member selected from the group consisting of isoolefin-multiolefin butyl rubber and chlorinated isoolefin-multiolefin butyl rubber; an outer layer including an open-bellied body comprising two opposing sidewalls, spaced bead portions and a median tread area; and an intermediate layer defining a carcass including a member selected from the group consisting of natural rubber, a rubbery copolymer of butadiene and styrene, and mixtures thereof having a plurality of cords imbedded therein;

said intermediate layer being adhesively united to said inner layer by means of two interposed cements, the first cement being adjacent the butyl rubber inner layer and comprising a vulcanizable isoolefin-multiolefin butyl rubber chlorinated to contain at least 0.5 weight percent combined chlorine but not more than about one atom of chlorine per double bond in the polymer, said cement being free of other vulcanizable rubbery materials, the second cement being adjacent the carcass layer and comprising an admixture of both said chlorinated butyl rubber and natural rubber.

References Cited in the file of this patent

UNITED STATES PATENTS

| | | |
|---|---|---|
| 2,442,083 | Hall et al. | May 25, 1948 |
| 2,467,322 | Lightbown et al. | Apr. 12, 1949 |
| 2,522,138 | Schaffer | Sept. 12, 1950 |
| 2,575,249 | Connell et al. | Nov. 13, 1951 |
| 2,676,636 | Sarbach | Apr. 27, 1954 |
| 2,698,042 | Perkins | Dec. 28, 1954 |
| 2,732,354 | Morrissey et al. | Jan. 24, 1956 |
| 2,775,537 | Wilson et al. | Dec. 25, 1956 |
| 2,944,578 | Baldwin et al. | July 12, 1960 |